United States Patent
Choi et al.

(10) Patent No.: US 7,275,241 B2
(45) Date of Patent: Sep. 25, 2007

(54) DYNAMIC INSTRUMENTATION FOR A MIXED MODE VIRTUAL MACHINE

(75) Inventors: Jong-Deok Choi, Mount Kisco, NY (US); Flavio Alvarenga Bergamaschi, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 10/719,048

(22) Filed: Nov. 21, 2003

(65) Prior Publication Data

US 2005/0114848 A1    May 26, 2005

(51) Int. Cl.
    *G06F 9/45* (2006.01)
(52) U.S. Cl. ............... 717/143; 717/142; 717/148
(58) Field of Classification Search ............ None
    See application file for complete search history.

(56) References Cited

U.S. PATENT DOCUMENTS

| | | | |
|---|---|---|---|
| 6,041,179 A | 3/2000 | Bacon | 395/709 |
| 6,604,167 B1 | 8/2003 | Blandy | 711/100 |
| 6,851,109 B1* | 2/2005 | Alexander et al. | 717/148 |
| 6,854,114 B1* | 2/2005 | Sexton et al. | 718/1 |
| 6,971,091 B1* | 11/2005 | Arnold et al. | 717/145 |

* cited by examiner

*Primary Examiner*—Chuck Kendall
(74) *Attorney, Agent, or Firm*—Michael J. Buchenhorner; Douglas W. Cameron

(57) ABSTRACT

The present invention provides a method, apparatus, and computer instructions for dynamic intermediate code transformation in a mixed mode compiler. In an exemplary embodiment, an object code compiler of a virtual-machine, such as the just-in-time (JIT) compiler (415) of a Java virtual machine (JVM), takes loaded classes and compiles these into object code (416). A JIT-enabled dynamic instrumentation (JEDI) interface (420) provides information to an application (e.g., a tool with a GUI), and passes requests for transformation to the JIT (415) and class-loader (410). If loaded, JEDI controls the JIT compiler (415) to compile and transform the class into object code. Thus, dynamically transformed object code is produced without transformation or re-loading of the loaded classes.

26 Claims, 5 Drawing Sheets

DYNAMIC INSTRUMENTATION FOR A MIXED MODE VIRTUAL MACHINE

TECHNICAL FIELD

The invention disclosed generally relates to computers and computer software. More specifically, the invention is generally related to program transformation tools.

BACKGROUND OF THE INVENTION

The increasing complexity of software programs has led to the development of a variety of tools to aid programmers and administrators in understanding the structure and functionality of their programs. Examples of these program analysis tools include debuggers, runtime execution visualizers, development environments and software quality tools. A debugger is a program that interactively traces the logic flow of a program and the contents of memory elements to locate, analyze, and correct bugs in another computer program. Runtime execution tools like profilers use processes like sampling or direct instrumentation to obtain a variety of runtime information, such as heavy memory allocation sites, CPU usage hot-spots, unnecessary object retention, and monitor contention, for a comprehensive performance analysis. A typical integrated development environment (IDE) includes a software application that provides software components to quickly prototype a new application.

A particularly useful category of runtime execution tools are dynamic instrumentation tools. Dynamic instrumentation is a technique that instruments the running application with probes to collect runtime information. It is an efficient and flexible technique, and does not depend on a priori knowledge on where to instrument or with what probes. It has been used widely by various debugging and performance tools for applications written in compilation languages such as C and C++. FIG. 2 illustrates dynamic instrumentation in such a system. The loaded binary code is instrumented with probes during runtime by the dynamic instrumenter. For simplicity of illustration, some of the details of the runtime environment are omitted, such as the additional library code loaded and executed along with the application code.

Unlike C or C++, platform independent languages like Java have compilers that generate classfiles, not binary code, from their Java source files. These classfiles are not directly executable by the system hardware, and need to be either interpreted or converted into binary code by the jit-compiler. FIG. 3A generally shows a system for operating a Java program, including the Java compiler 302, and the Java Runtime Environment (JRE) with the Java interpreter 312. During runtime, the Java class loader 310 loads classes from the classfiles 303, and the Java interpreter 312 interprets the bytecodes of the loaded classes 311. Again, for simplicity of illustration some details of the runtime are omitted, such as the Java Class Library (JCL) typically loaded and executed along with the application classfiles.

To improve the execution speed, JVM's employ just-in-time (JIT) compilation, which generates and executes binary code from bytecodes during the runtime. FIG. 3B shows the Java runtime environment with a JIT compiler 315. Along with the Java interpreter 312, the JIT compiler 315 compiles some of the loaded classes 311 into binary code 316, which is then executed by the hardware 317. Note that although the C/C++ compile-and-run structure in FIG. 2 and the JIT runtime structure in FIG. 3B look similar, there is a major difference. Since the compiler 202 in FIG. 2 runs before execution, any transformation by the compiler 202 is static, i.e., done before the runtime. The JIT-compiler 315 in FIG. 3B, however, runs during execution, and any transformations by the JIT-compiler 315 is dynamic, i.e., done during the runtime.

This program instrumentation is an example of a broader class of tools known as program transformation (PT) tools. Runtime program transformation tools such as dynamic instrumentation insert probes into an application in such a manner that during execution, each probe generates dynamic information on the execution state or an event of the application, and transforms the object code of the application dynamically while the application is running. Another example of program transformation is Aspect Oriented Programming, which restructures the program based on different aspects of the same application.

Runtime PT tools for virtual-machine (VM) applications, such as Java applications or .NET applications, transform their intermediate code, e.g., Java's bytecode or .NET's intermediate code (for simplicity of discussion the term "bytecode" is used below in connection with the preferred embodiment, but this should not be understood restrictively as applying to VM intermediate code such as Java's bytecode, but to all forms of intermediate code such as intermediate code used with .NET code.) The VM executes the (transformed) bytecode by interpreting it, or first converting it into object code and then executing the object code. In Java the unit of bytecode to be processed by VM for execution is a class file. By class loading, we follow the terminology of Java to mean the process of VM reading a unit of bytecode and readying it for execution.

However, bytecode transformation (BT) as a means of runtime program transformation has several critical problems. The first of these is the loss of adaptability of the transformation to the execution behavior that is constantly changing during an execution. To adapt to the changing execution behavior, runtime tools sometimes require multiple (re-)transformations of the application during execution. In Java, however, a loaded class becomes non-writable (i.e., read-only or immutable), which makes multiple re-transformations of bytecode during execution very costly (albeit not impossible). To carry out multiple re-transformations during execution generally involves a process called unloading and reloading the class; a less commonly used possibility is to use an interface of the VM called JVMDI. Both of these approaches incur very high runtime overhead. Because of the read-only requirement of a loaded class and the high runtime overhead of re-transformations, bytecode transformation tools typically transform a class only once statically before it is loaded (e.g., ShrikeBT) or dynamically while it is being loaded (e.g., JiTi), and disallow re-transformations of the bytecode. Further, this approach only allows for transformations that can be expressed in bytecode, and is inadequate for general instrumentations. For example, it does not allow for instrumentations for gathering runtime information on object identities, synchronization states, or garbage collection because probes for them are not expressible in bytecode.

The second problem is the expressiveness of the bytecode in collecting information on the states and events of the application during execution. bytecode transformation manipulates a class by restructuring, inserting, or deleting part of the bytecode of the class. The result of a correctly performed bytecode transformation is a class with transformed bytecode, whose execution behavior should be expressible by a program written in the source language. This property of bytecode transformation may be desirable for certain transformations, but may be too much of a restriction on runtime instrumentations. Bytecode transformation instrumentations can observe and collect information only on the states and events that can be expressed in the source language. For example in Java, they cannot directly collect information on states or events related to garbage collection or meta information on objects, which are not expressible in Java. They can indirectly collect such information with help from native code within and without the VM, but only through an interface called JNI, which incurs very high execution overhead. Furthermore, information that can be collected without JNI still needs additional execution of bytecode for the purpose of collecting, maintaining, and reporting the information. The additional execution can perturb the original execution of the application through libraries shared by the original application and the instrumentation bytecode. The perturbation by the instrumentation code can be large enough to render the collected information useless. Minimizing the perturbation would require using native code for the collection and report of the runtime information, which would require use of the expensive JNI.

The third problem is that some VM implementations depend on specific bytecode construction of some classes in the libraries provided along with the VM. For example, some Java VM implementations depend on specific bytecode construction of some Java class files in the Java runtime libraries. But some JVM implementations are known to crash when bytecode transformation is applied to these certain classes in the Java Class Library (JCL).

Thus, there is a need for a better way to dynamically transform intermediate code during runtime.

SUMMARY

The present invention provides a method, apparatus, and computer instructions for dynamic intermediate code transformation in a mixed mode compiler. In an exemplary embodiment, an object code compiler of a virtual machine, such as the just-in-time (JIT) compiler of a Java virtual machine (JVM), takes loaded classes and compiles these into object code. A JIT-enabled dynamic instrumentation (JEDI) interface provides information to an application (e.g., a tool with a GUI), and passes requests for transformation to the JIT and class-loader. If loaded, JEDI controls the JIT compiler to compile and transform the class into object code. Thus, dynamically transformed object code is produced without transformation or re-loading of the loaded classes.

One embodiment includes a program in which any new invocation of a method of the class will execute the new object code, while existing instances of old-object methods continue their execution until they terminate. An alternative approach allows the request to ask for immediate replacement of old object code with the new object code. In this latter case, any activation stack of an old-object method need be adjusted, if necessary, so that existing invocations of old-object methods can continue with the adjusted activation stack. Some heap objects might also need be modified, and decisions such as these can be made automatically by JEDI or explicitly by the transformation request.

BRIEF DESCRIPTION OF THE DRAWINGS

Our invention, together with certain objectives and advantages, may be better understood by reference to the following detailed description of an illustrative, presently preferred embodiment thereof, when read in conjunction with the accompanying drawings, of which.

DESCRIPTION OF THE PREFERRED EMBODIMENT

Turning now to a preferred embodiment of the invention, a just-in-time (JIT) compiler of a virtual machine (VM) is operable for dynamic transformation (and retransformation) of the VM intermediate code. As noted above, dynamic instrumentation has not been widely used in a virtual-machine environment such as Java. In Java, a class loaded by the Java Virtual Machine (JVM) is regarded as an immutable object, and modifying a loaded class violates the Java rules. However, the present invention permits one to dynamically transform VM applications like Java, even with classes already loaded and being executed. The technique according to a preferred embodiment uses the VM's just-in-time (JIT) compilation process for the transformation. Since the JIT compiler runs beneath the VM, invisible to the VM, dynamic transformation through the JIT compiler does not violate the VM (Java) rules like the immutability of loaded classes. Instead of transforming loaded classes, the JIT compiler is controlled to convert selected classfiles into object code, and transform the object code for those aspects or objects that one desires to dynamically transform. This novel technique can be used for both semantics-preserving transformations, such as dynamic instrumentation or optimization, and non-semantics-preserving transformations, such as dynamic aspect-oriented programming. This process is known as Jit-Enabled Dynamic Instrumentation (JEDI).

In the preferred JEDI process, the JIT compiler converts the bytecode into an object code that the VM executes. The object code generated by the JIT compiler does not have the read-only restriction that a loaded class has. It solves all three problems of bytecode transformation mentioned above. First, the JIT compiler can re-generate the object code for a loaded class as many times as necessary without violating the read-only requirement of a loaded class. JIT compilation is also very efficient. Second, the JIT compiler generates object code, which can directly interact with any other object code, within and without the VM, without requiring the expensive JNI (Java native interface). The object code can access the internal state of the VM and collect meta data that bytecode itself cannot access. Collecting and reporting runtime information can be written in object code that interacts with the object code generated by the JIT compiler for the purpose of instrumentation. Third, it will be transparent to VM implementations since execution of object code is performed outside the VM.

Figure 1:
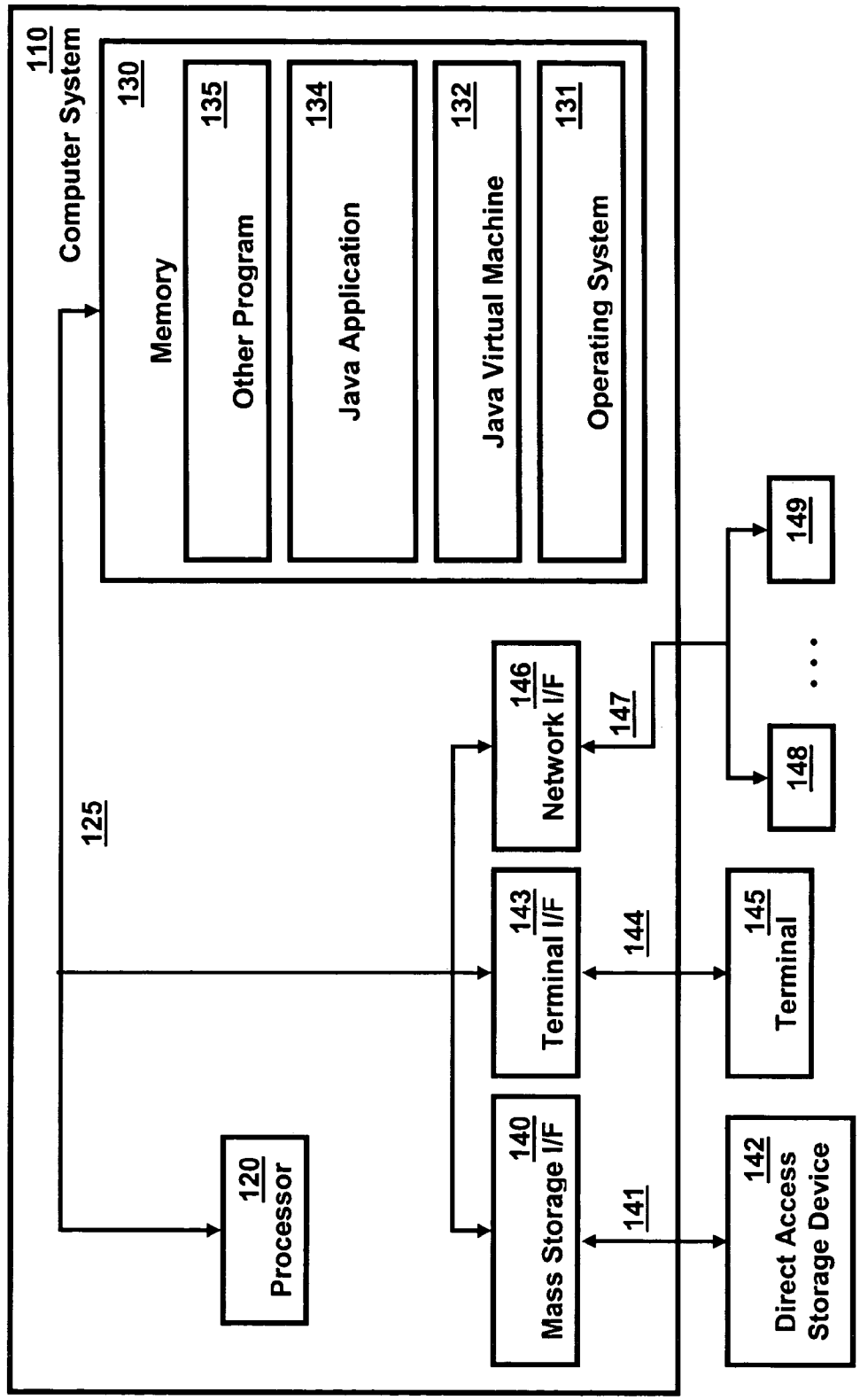
FIG. 1 is a block diagram of a computer system consistent with the invention.
Figure 2:
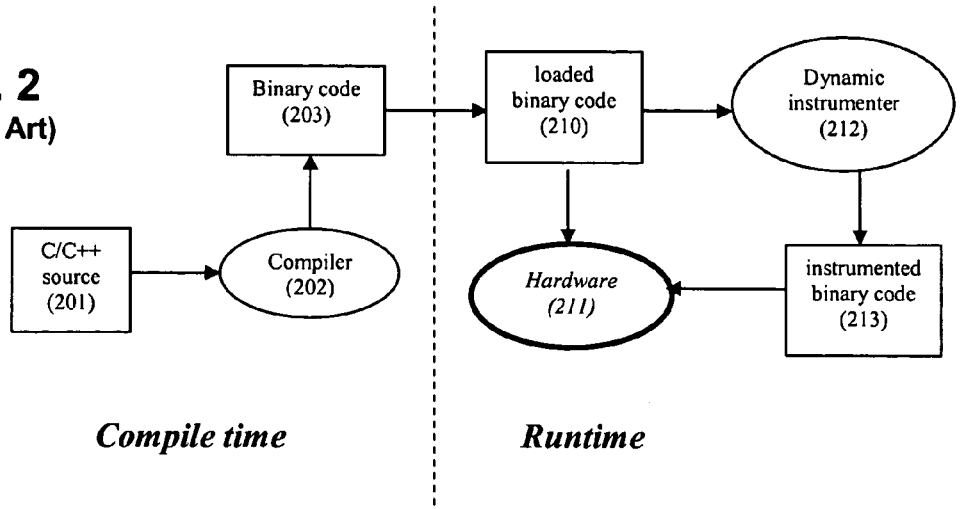
FIG. 2 is an illustration of a software program runtime environment for C/C++ in which dynamic instrumentation is used, such as is found in the prior art.
Figure 3A:
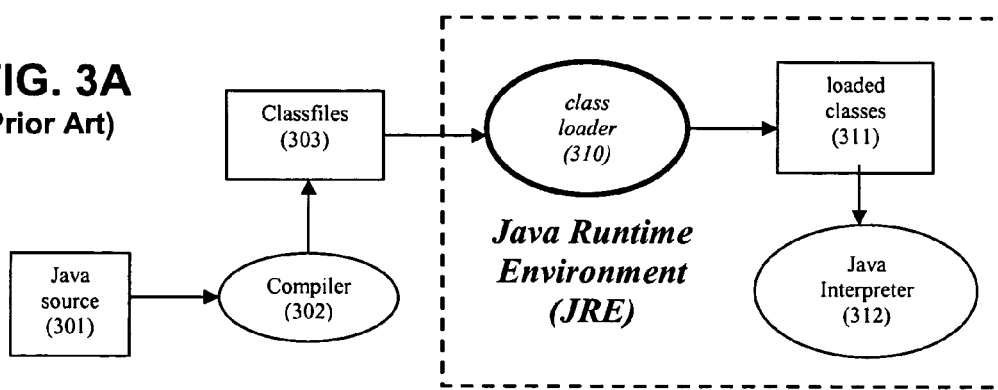
FIGS. 3A and 3B, respectively, illustrate a runtime environment for Java, and a runtime environment for Java with JIT (just-in-time) compilation, respectively, such as is found in the prior art.
Figure 3B:
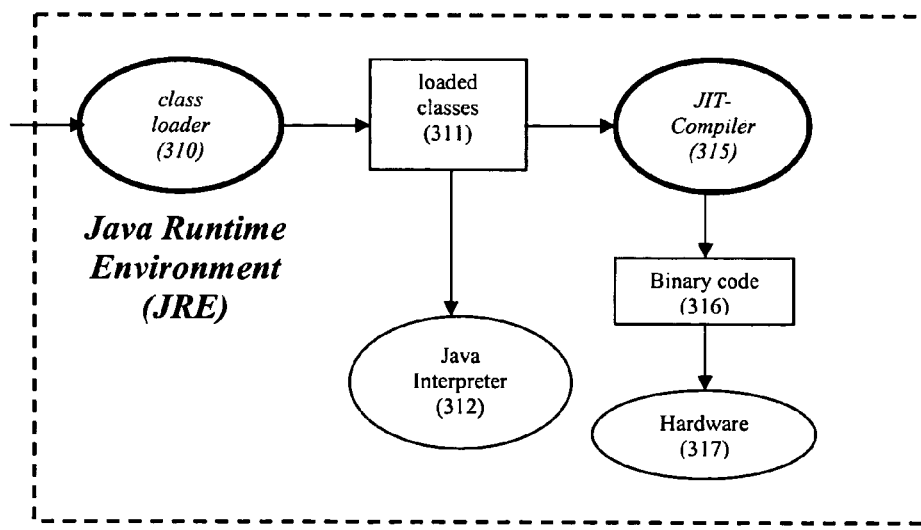

With reference now to the figures and in particular with reference to FIG. 1, a pictorial representation of an information processing system in which the present invention may be implemented is depicted in accordance with certain presently preferred embodiments of the invention. In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

A particular information handling or processing system for implementing the present embodiments is described with reference to FIG. 1. However, those skilled in the art will appreciate that embodiments may be practiced with any variety of computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

In addition, various programs and devices described here may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Referring now to FIG. 1, a computer system 110 consistent with the invention is shown. For purposes of the invention, computer system 110 may represent any type of computer, information processing system or other programmable electronic device, including a client computer, a server computer, a portable computer, an embedded controller, a personal digital assistant, etc. The computer system 110 may be a standalone device or networked into a larger system. In one embodiment, the computer system 110 is an eServer iSeries OS/400 computer available from International Business Machines of Armonk, N.Y.

The computer system 110 could include a number of operators and peripheral systems as shown, for example, by a mass storage interface 140 operably connected to a direct access storage device 142 via high speed bus interface 141, by a video interface 143 operably connected to a display 145, and by a network interface 146 operably connected to a plurality of networked devices 148 . . . 149. The display 145 may be any video output device for outputting a user interface. The networked devices 148-149 could be desktop or PC-based computers, workstations, network terminals, or other networked information handling systems, connected by any one of a variety of networking systems including a local area network (LAN) 147, personal area network (PAN), or wide area network (WAN).

Computer system 110 is shown with a system environment that includes at least one processor 120, which obtains instructions or operation codes (also known as opcodes) and data via a bus 115 from a main memory 130. The processor 120 could be any processor adapted to support the debugging methods, apparatus and article of manufacture of the invention. In particular, the computer processor 120 is selected to support monitoring of memory accesses according to user-issued commands. Illustratively, the processor is a PowerPC available from International Business Machines of Armonk, N.Y.

The main memory 130 could be one or a combination of memory devices, including random access memory, non-volatile or backup memory (e.g., programmable or flash memories, read-only memories, etc.). In addition, memory 130 may be considered to include memory physically located elsewhere in a computer system 110, for example, any storage capacity used as virtual memory or stored on a mass storage device or on another computer coupled to the computer system 110 via bus 115.

The main memory 130 includes an operating system 131, a Java virtual machine 132, a Java application 134, and other non-Java programs 135. These other programs 135 could include a programming analysis and transformation tool. The program analysis and transformation tools can include any of a class of programs that perform program understanding (e.g., a debugger, runtime tracers or profilers, or quality analyzer) and dynamic instrumentation programs. These are generally implemented in software, but can be implemented in a combination of hardware (firmware) and software. In the case of a JEDI-compatible dynamic instrumentation tool, such could be any of a class of known dynamic instrumentation programs configured to operate via a JEDI interface to control the VM class loader and JIT compiler, and may in turn interface with other programs or a user via a GUI (graphical user interface) at terminal 145. Although illustrated as integral programs, one or more of the foregoing may exist separately in the computer system 110, and may include additional components not described. Processor 120 implements the processes illustrated using computer implemented instructions, which may be located in a memory such as, for example, main memory 130, memory 142, or in one or more peripheral devices 148-149.

Figure 4:
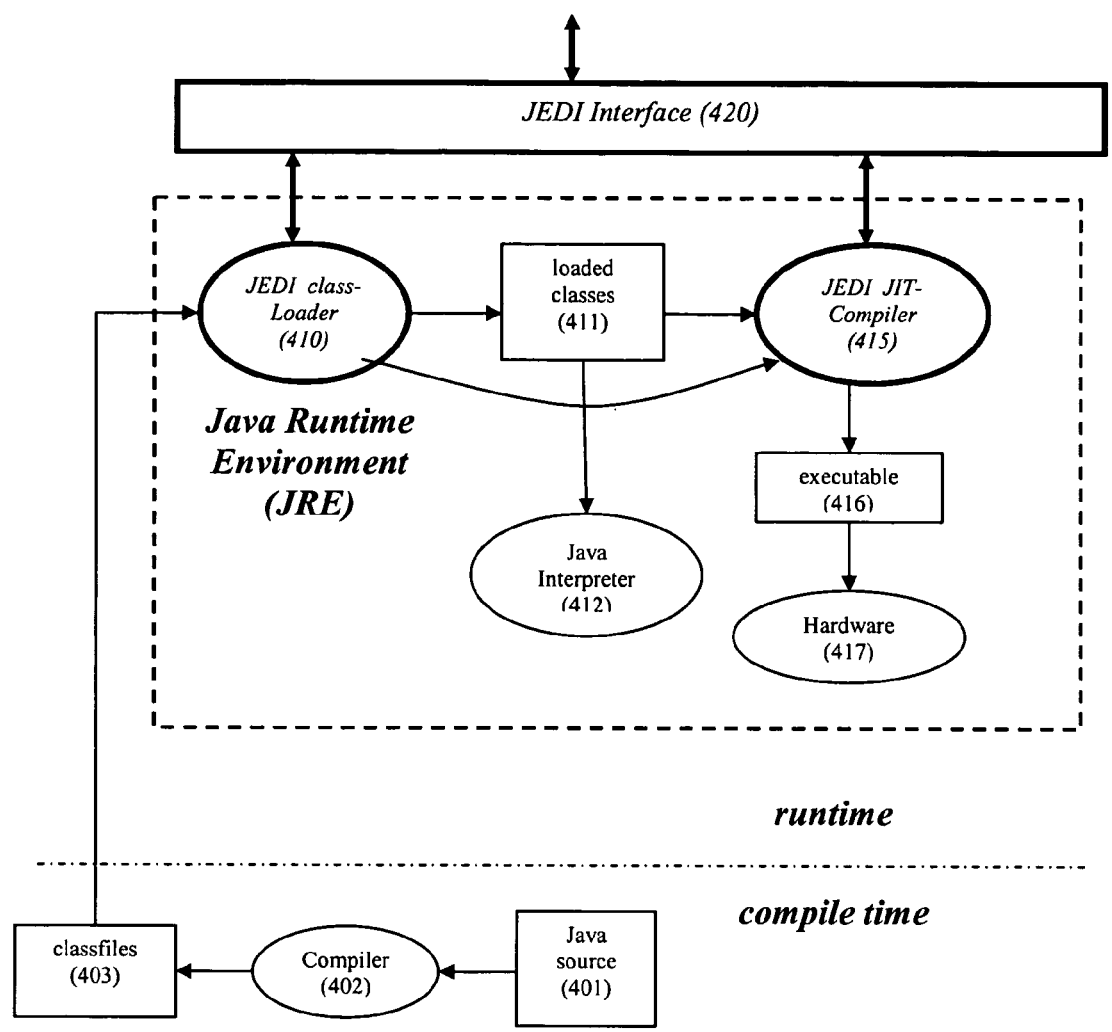
FIG. 4 illustrates a runtime environment operable for dynamic instrumentation according to a first embodiment of the invention.

Turning now to FIG. 4, the major components of a preferred JEDI system for dynamic transformation of Java applications are illustrated. These components include:

1. JEDI class-loader 410. This component, in addition to typical class loading functionality, operates, in response to instructions via JEDI interface 420, to inform the JEDI JIT-compiler 415 when a class is loaded that needs to be transformed.

2. JEDI JIT-compiler 415. This component, in addition to typical JIT-compilation, dynamically transforms selected native code.

3. JEDI Interface 420. This component interacts with clients of JEDI requesting dynamic transformation, such as JVMTI (Java virtual machine testing interface), JVMDI (Java virtual machine debugger interface), and Dynamic AOP (Aspect-Oriented Programming). JVM Interface 420 tells JEDI class-loader 410 and JEDI JIT-compiler 415 what classes need be transformed and how.

In dynamically transforming a Java application, JEDI differs from prior approaches in, among others, the following aspects:

1. JIT-based dynamic transformation: JEDI performs dynamic transformation by JIT-compilation without violating Java's rule that loaded classes are immutable.

2. JVM independent transformation: Some JVM's rely on specific contents of classfiles for correct execution. These JVM's fail to operate correctly when certain JCL classfiles are modified by bytecode transformation. JEDI's transformation is not visible to JVM since it is performed by the JIT-compiler to native code, which is executed directly by the CPU independently of JVM.

3. Native transformation. JEDI allows for native probes directly inserted into the binary code 416 without wrapping them with expensive Java Native Interface (JNI) calls. This is possible because JEDI's dynamic transformation produces native code, which can be mixed with native probes in typical manners. In contrast, Bytecode instrumentation (BCI), which refers to instrumentation by bytecode transformation, can only insert Java probes—probes that can be expressed in Java bytecode. This greatly limits the instrumentation capability of BCI. For example, native probes, designed to extract runtime information kept exclusively by the JVM, cannot be instrumented directly by Bytecode instrumentation. Examples of such information include object or thread identification, lock states, garbage collection states, or heap management states. To extract such information, Bytecode instrumentation needs to insert a Java probe that invokes a native probe via expensive JNI calls. Optimizing away JNI calls with Bytecode instrumentation is difficult because Bytecode instrumentation runs outside of the JVM and cannot effectively communicate with the JIT-compiler.

Depending on the status of the class to be dynamically transformed, there are typically three different operational scenarios for JEDI. In the first case, the class to be transformed has not been loaded yet in the class loader 410. In this case, JEDI defers the transformation request until the class gets loaded. Upon loading the class, the JEDI class loader 410 notifies the JEDI JIT-compiler 415 of the loaded class, and the JEDI-JIT compiler 415 generates native code from the loaded class. At the same time, JEDI-JIT compiler 415 transforms the native code 416. Since the JIT compiled code is native code, methods in the class will be executed directly by the hardware 417, without interpretation by interpreter 413.

In the second case, the class to be transformed has already been loaded 411, but has not been JIT-compiled. In this case, the JEDI JIT-compiler operates on the loaded class 411 to generate native code; at the same time, the JEDI-JIT compiler 415 transforms the native code as directed into a new binary 416. The transformed native code 416 gets executed in the typical manner, including when a method of the class gets invoked, or immediately after stack rewriting is applied to all the stack frames of the transformed code 416.

Finally, the third case is when the class has already been JIT-compiled. In this case, the JEDI JIT-compiler 415 regenerates the native code and, at the same time, transforms the regenerated native code. The transformed native code 416 gets executed when a method of the class gets invoked. Alternatively, it can get executed immediately after stack rewriting.

Figure 5:
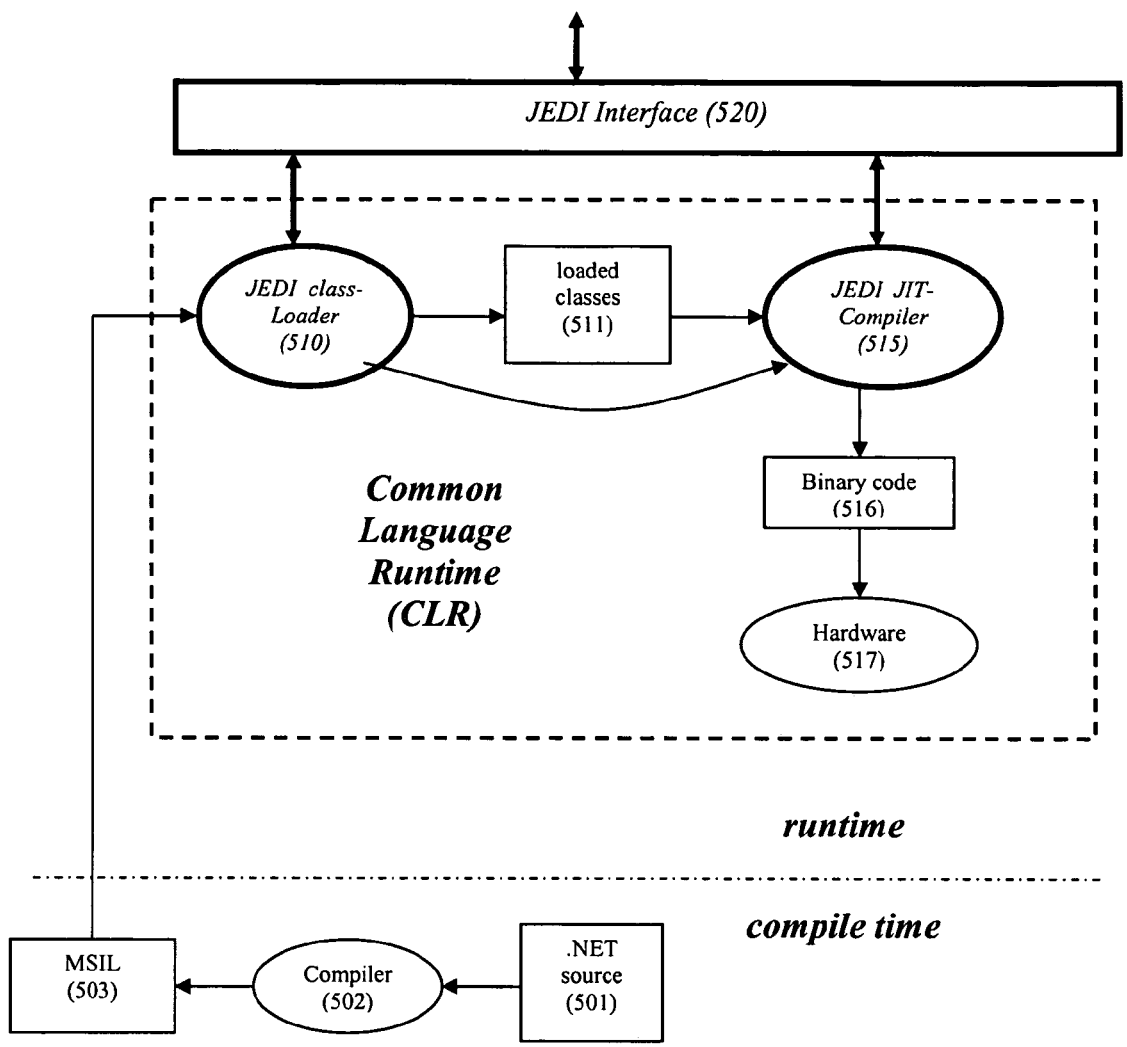
FIG. 5 illustrates another runtime environment operable for dynamic instrumentation according to a second embodiment of the invention.

Turning now to FIG. 5, the major components of JEDI for dynamic transformation of a .NET application are illustrated. These components include:

1. .NET compiler 502. This compiles .NET source program 501 into MSIL (Microsoft Intermediate Language) 503. This all occurs at compile time, i.e., before run-time.

2. JEDI class-loader 510, which, in addition to the usual class loading, informs JEDI JIT-compiler 515 when a class that need be transformed is loaded.

3. JEDI JIT-compiler 515, which, in addition to the usual JIT-compilation, also transforms the binary code for dynamic transformation.

The major difference between FIG. 4 for Java and FIG. 5 for .NET is that in the latter case there is no interpretation of the loaded classes. One skilled in the art will also appreciate that there are many variations possible on the structure and use of JEDI and JEDI-compatible programs, and that its operation is not limited to the specifically discussed .NET and Java implementations. Thus, JEDI has broad application to any mixed-mode run-time environment, where both an interpreter and compiler are used to operate on intermediate code. There are also a variety of additional features that may be present depending on the specific environment (e.g., JCLs for Java) or other design choices, and a skilled artisan will readily understand how to apply JEDI in the context of these implementation-specific choices.

When applying JEDI in the preferred embodiment, one will want to implement a well-defined interface. The following is the list of the presently preferred calls for JEDI Interface 420/520. For ease of representation, the semantics of each call is sometimes described as if native code was generated after bytecode transformation. However, JEDI JIT compiler preferably performs the transformation directly while generating native code, without any bytecode transformation.

1. InsertNewBytecodesBefore(class, method, bytecodeindex, newByteCodes) which generates native code from method in class. The generated native code is semantically equivalent to native code generated from method in class after newByteCodes is inserted immediately before bytecodeindex of method in class.

2. InsertNewBytecodesAfter(class, method, bytecodeIndex, newByteCodes), which generates native code from method in class similarly to InsertNewBytecodesBefore except that newByteCodes is inserted immediately after bytecodeIndex of method in class.

3. DeleteBytecodes(class, method, bytecodeindex, numByteCodes), which generates native code semantically equivalent to native code from method in class with a numByteCodes bytecodes deleted starting from bytecodeindex of method in class.

4. ReplaceClassfile(oldClass, newClass), which generates native code equivalent to replacing oldClass with newClass.

5. ReplaceMethod(class, oldMethod, newMethod), which generates native code equivalent to replacing oldMethod in class with newMethod.

6. InsertJNICallBefore(class, method, bytecodeindex, nativeMethod, isSafeCall), which generates native code from method in class. The generated native code is semantically equivalent to native code generated from method in class after a Java Native Interface (JNI) call to nativeMethod is inserted immediately before bytecodeindex of method in class. The expensive JNI call, however, is optimized and replaced with a simple native method call if isSafeCall is true. This optimization applies to most instrumentation probes, which do not modify the Java application runtime state.

7. InsertJNICallAfterclass(method, bytecodeindex, nativeMethod, isSafeCall), which generates native code from method in class similarly to InsertJNICallBefore except that a Java Native Interface (JNI) call to nativeMethod is inserted immediately after bytecodeindex of method in class. The JNI call is optimized away if isSafeCall is true.

Figure 6:
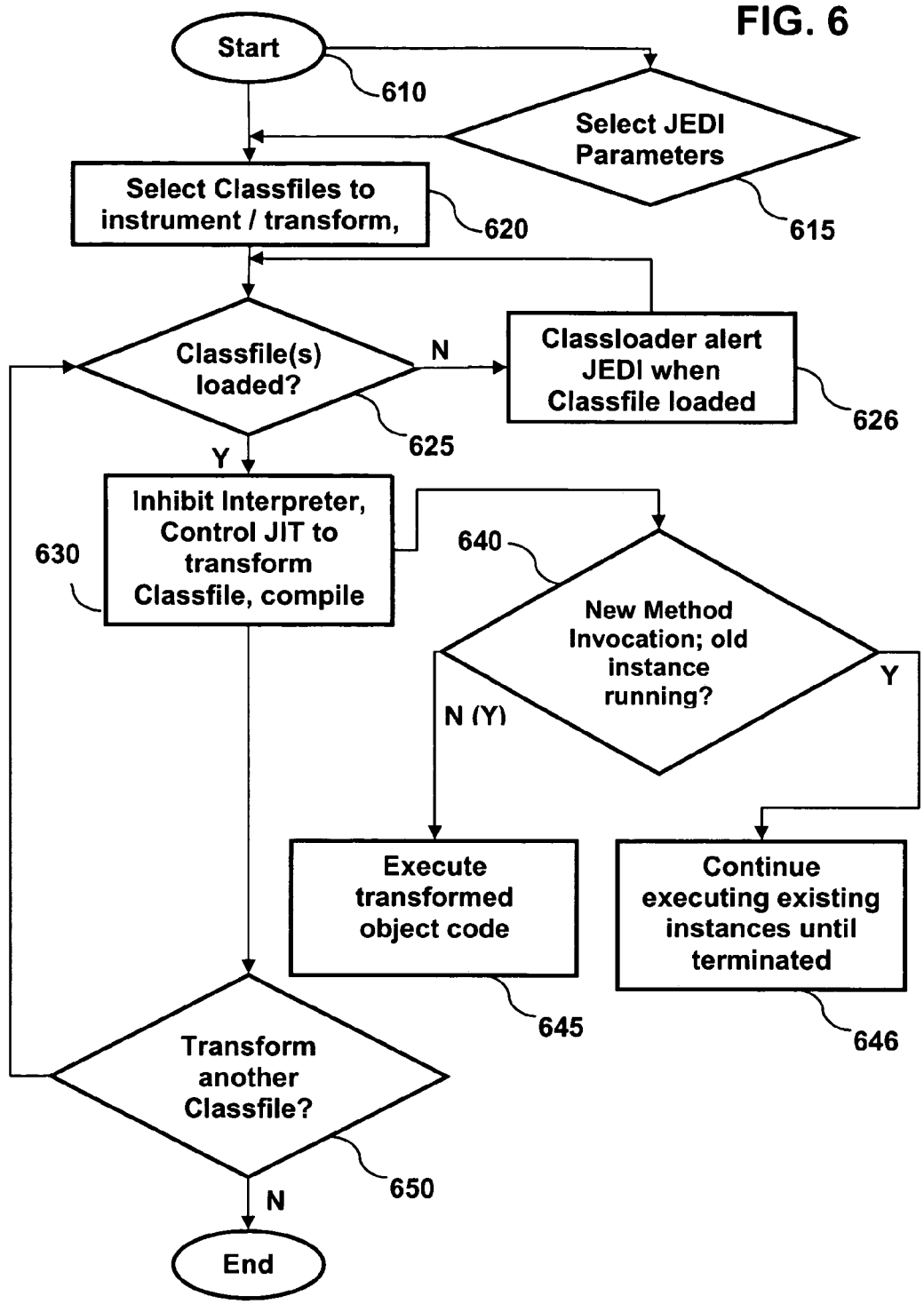
FIG. 6 is a flow chart of an illustrative dynamic instrumentation operation according to a further embodiment of the invention.

Turning now to FIG. 6, a sample process flow using JEDI is illustrated. JEDI works in concert with the classloader 410/510 and the JIT compiler 415/515 of a VM, and controls the runtime transformation based on the transformation request it receives. JEDI has a well-defined interface 420/

520 that various tools, such as a GUI interacting with the user or runtime performance/debugging tools, can use for requesting JEDI to transform bytecode of a class (step 620). The interface consists of the name of the class to be transformed, the transformation information on the bytecode instructions to be transformed and how, and additional flags that can be defined for use with other purposes (e.g., step 615, selecting additional design specific call parameters). Upon receiving a request, JEDI determines via classloader 410/510 whether the class to be transformed has already been loaded (step 625). If it has not, JEDI marks the class to be transformed and records its transformation information (step 626). Later when the class gets loaded, the classloader 410/510 informs JEDI of the load event, and JEDI orders the JIT compiler 415/515 to JIT-compile and transform the class into object code (step 630). If the class has already been loaded, JEDI immediately orders the JIT compiler 415/515 to JIT-compile and transform the class into object code.

Any new invocation of a method of the class will execute the new object code (step 645), while existing instances of old-object methods continue their execution until they terminate (step 646). However, variations of this are possible. For example, the request can ask for immediate replacement of the old object code with the new object code. In this case, any activation stack of an old-object method need be adjusted, if necessary, so that existing invocations of old-object methods can continue with the adjusted activation stack. Furthermore, some heap objects might also need be modified. Decisions on these can be made automatically by JEDI or explicitly by the transformation request.

Of course, one skilled in the art will appreciate how a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The signal bearing media may take the form of coded formats that are decoded for actual use in a particular data processing system. Moreover, while the depicted embodiment includes an example in a Java environment, the processes of the present invention may be applied to other programming languages and environments.

In conclusion, the above description has been presented for purposes of illustration and description of an embodiment of the invention, but is not intended to be exhaustive or limited to the form disclosed. This embodiment was chosen and described in order to explain the principles of the invention, show its practical application, and to enable those of ordinary skill in the art to understand how to make and use the invention. Many modifications and variations will be apparent to those of ordinary skill in the art. Thus, it should be understood that the invention is not limited to the embodiments described above, but should be interpreted within the full spirit and scope of the appended claims.

What is claimed is:

1. A method for dynamic transformation of programs, said method operable at least in part within an information processing system, the method comprising:
   accessing a dynamic instrumentation interface of a mixed mode runtime environment, the accessing step comprising determining whether a first class is loaded; initiating an instrumentation client program; and making a predetermined transformation call to the interface; and
   controlling a compiler of the mixed mode runtime environment via the interface to transform a program, the controlling step comprising, if the first class is loaded, controlling the compiler to compile the first class into an executable program and transform the executable program into a transformed program according to the predetermined transformation call; and,
   if the first class is not loaded, storing transformation information relating to the first class and
   monitoring the mixed mode runtime environment to determine when the first class is loaded.

2. The method of claim 1, wherein the mixed mode runtime environment is a virtual machine and the compiler is a just in time compiler.

3. The method of claim 2, wherein the virtual machine is one of the group of a Java virtual machine and a .NET virtual machine.

4. The method of claim 1, wherein the step of monitoring the mixed mode runtime environment to determine when the first class is loaded is performed by a class loader responsive to instructions via the interface.

5. The method of claim 1, further comprising, if the first class is loaded, allowing a current instantiation of the first class to run until terminated.

6. The method of claim 1, further comprising, when the first class is loaded, replacing currently running code based on an old-object method of the first class with the transformed program and adjusting an activation stack so existing invocations of the old-object method continue executing after adjusting the activation stack.

7. The method of claim 1, wherein
   the controlling step further comprises
   the instrumentation client controlling the compiler via the call to the interface.

8. The method of claim 7, wherein the predetermined transformation call is one of a group consisting of: InsertNewBytecodesBefore; InsertNewBytecodesAfter; DeleteBytecodes; ReplaceClassfile; ReplaceMethod; InsertJNICallBefore; and; InsertJNICallAfterclass.

9. An information handling system comprising
   a processor,
   a dynamic instrumentation interface overably coupling a mixed mode virtual machine and a program instrumentation tool; and
   the mixed-mode virtual machine comprising:
      a compiler operably coupled to the interface and responsive to signaling from the interface to transform a program; and class loader instructions for determining whether a first class is loaded, wherein
      if the first class is not loaded, storing transformation information relating to the first class and
      when the first class is loaded, providing first class information from a class loader to the compiler, compiling the first class into an executable program and transforming the program into a transformed program according to a predetermined transformation call.

10. The system of claim 9, wherein the compiler comprises a just in time compiler, the virtual machine plural instructions further comprise transformation instructions operable for controlling the just in time compiler to compile the first class into a processor executable program and to transform the executable program into a transformed program.

11. The system of claim 10, wherein the virtual machine is one of a group of a Java virtual machine and a .NET virtual machine, and the class loader instructions are further operable, when the first class is not loaded, to store transformation information relating to the first class and monitor the virtual machine to determine when the first class is loaded.

12. The system of claim 11, wherein the class loader instructions for monitoring and determining when the first class is loaded are performed by a class loader responsive to first transformation signaling via the interface.

13. The system of claim 10, wherein the virtual machine is one of the group of a Java virtual machine and a .NET virtual machine, the transformation instructions comprising further instructions operable for, when the first class is loaded, allowing a current instantiation of the first class to run until terminated.

14. The system of claim 13, further comprising operating instructions independent of the virtual machine, wherein the transformed program is operably executed by the operating instructions independent of the virtual machine.

15. The system of claim 10, the transformation instructions comprising further instructions configured to, when the first class is already loaded, replace currently running code based on an old-object method of the first class with the transformed program and adjust an activation stack so existing invocations of the old-object method continue executing after adjusting the activation stack.

16. The system of claim 9, further comprising a client tool program having client transformation instructions operable for initiating a transformation request to the interface via a predetermined transformation call, thereby controlling the compiler via the call to the interface.

17. The system of claim 16, wherein the interface comprises further instructions responsive to the predetermined call, the call being one of a group consisting of: InsertNewBytecodesBefore; InsertNewBytecodesAfter; DeleteBytecodes; ReplaceClassfile; ReplaceMethod; InsertJNICallBefore; and InsertJNICallAfterclass.

18. A program product in a recordable type medium a signal bearing medium, the program product comprising instructions executable by a device for presenting a hierarchical representation of a target program, the product comprising:

virtual machine instructions operable as a mixed-mode virtual machine comprising a compiler, the compiler comprising class loader instructions for determining whether a first class is loaded;

interface instructions operable as a dynamic instrumentation interface for coupling the virtual machine and a program instrumentation tool, further operably responsive to signaling from the interface to transform a program being operated on by the virtual machine the transformation comprising:

if the first class is loaded, controlling the compiler to compile the first class into an executable program and transform the executable program into a transformed program according to the predetermined transformation call; and, if the first class is not loaded, storing transformation information relating to the first class and monitoring the mixed-mode virtual machine to determine when the first class is loaded.

19. The program product of claim 18, wherein the compiler is operable as a just in time (JIT) compiler, the virtual machine instructions further comprising: class loader instructions operable for determining whether a first class is loaded, and when the first class is loaded, providing first class information from a class loader to the JIT compiler; and transformation instructions operable for controlling the JIT compiler to compile the first class into a processor executable program and to transform the executable program into a transformed program.

20. The program product of claim 19, wherein the virtual machine is operable as one of a group of a Java virtual machine and a .NET virtual machine, and the class loader instructions are further configured to, when the first class is not loaded, store transformation information relating to the first class and monitor the virtual machine to determine when the first class is loaded.

21. The program product of claim 20, wherein the class loader instructions for monitoring and determining when the first class is loaded are configured to be performed by a class loader responsive to first transformation signaling via the interface.

22. The program product of claim 19, wherein the virtual machine is operable as one of the group of a Java virtual machine and a .NET virtual machine, the transformation instructions comprising further instructions configured to, when the first class is loaded, permit a current instantiation of the first class to run until terminated.

23. The program product of claim 22, wherein the transformed program is configured to be operably executed by operating instructions independent of the virtual machine.

24. The program of claim 19, the transformation instructions comprising further instructions configured to, when the first class is already loaded, replace currently running code based on an old-object method of the first class with the transformed program and adjust an activation stack so existing invocations of the old-object method continue executing after adjusting the activation stack.

25. The program product of claim 18, further comprising client transformation instructions operably part of a client tool and configured to initiate a transformation request to the interface via a predetermined transformation call, thereby controlling the compiler via the call to the interface.

26. The program product of claim 25, wherein the interface instructions are further configured to be responsive to the predetermined transformation call, the call being one of a group consisting of: InsertNewBytecodesBefore; InsertNewBytecodesAfter; DeleteBytecodes; ReplaceClassfile; ReplaceMethod; InsertJNICallBefore; and JnsertJNICallAfterclass.

* * * * *